Patented May 3, 1949

2,469,107

UNITED STATES PATENT OFFICE 2,469,107

CHLORINATED WAX-POLYSTYRENE COMPOSITION

Ludwig H. Dimpfl and William E. Elwell, Berkeley, Calif., assignors to California Research Corporation, San Francisco, Calif., a corporation of Delaware No Drawing. Application December 11, 1945, Serial No. 634,406

4 Claims. (Cl. 260—28.5)

This invention relates to an elastic composition which comprises polystyrene and chlorinated hydrocarbon wax.

It has been discovered that by blending polystyrene with chlorinated hydrocarbon wax in a certain critical range of proportions, remarkable and unexpected properties of reversible elasticity similar to that observed in rubber can be imparted to normally solid inelastic compositions. Such compositions are highly useful in a variety of applications by virtue of this property of elasticity.

Owing to its low density, clarity, and superior dielectric properties, polystyrene is widely used in the industry. However, it is rather brittle and can be flexed and stretched only to a minor degree. Neither is it too well adapted to compression and injection molding.

By introducing chlorinated hydrocarbon wax into normally hard, solid thermoplastic polystyrene resins in accordance with the present invention, a new product is obtained which not only displays a satisfactory compatibility of its components, better moldability and flexibility characteristics, but, additionally, possesses a reversible elasticity or resiliency with a wide range of extensibility, such as is found in rubber.

As initial material to produce the chlorinated wax to be used in polystyrene compositions of this invention, a petroleum hydrocarbon wax, such as yellow slack wax obtainable in the course of petroleum refining, may be used. This chlorinated wax is preferably of a viscous, normally liquid consistency and desirably contains about 42% of chlorine. The invention is best illustrated by a series of tests in which the clorinated wax product having a viscosity of between 22 and 32 poises at 25° C. and a specific gravity of between 1.162 to 1.175 was dissolved in ethylene dichloride to make up a 50% solution, and then was mixed with a solution of 10% of polystyrene, also in ethylene dichloride. The solvent was subsequently removed at a temperature from 37–49° C. under vacuum.

The product is characterized by its lack of "greasy" surface and the absence of a tendency to separate into two phases, as it is frequently observed on adding chlorinated hydrocarbons, for instance chlorinated polybutenes, to plasticized polystyrene. The most remarkable property of this new product, however, is its reversible elasticity, i. e., its ability to return to the original shape upon extensive deformation or elongation, in the same general manner as it is observed in the case of rubber.

The following table and data illustrate the critical proportions utilized:

| Percent by weight Polystyrene | Percent by weight Chlorinated Wax (42% Cl) | Description |
|---|---|---|
| 100 | 0 | Colorless, clear, hard solid. |
| 75 | 25 | Hard, waxy, incompatible solid. |
| 50 | 50 | Clear, pliable, resilient, tough like shoe leather. |
| 45 | 55 | Resilient, displaying reversible elasticity. |
| 40 | 60 | Wide range of reversible elasticity. |
| 35 | 65 | Wide range of reversible elasticity—Somewhat lower tensile strength. |
| 30 | 70 | Low tensile strength, surface dry to touch. |
| 25 | 75 | Low tensile strength, tacky surface. |
| 0 | 100 | Viscous liquid. |

The data in the above table indicate that the ingredients, i. e., polystyrene and chlorinated wax, are incompatible in the ratio of about 75 to about 25 parts by weight, respectively. Yet compositions containing more than about 35% of chlorinated wax are compatible, in other words, the two ingredients form a single homogeneous phase. These compositions are pliable, tough, resilient, and elastic.

When the content of chlorinated wax exceeds about 65%, the tensile strength of the composition correspondingly diminishes, although it retains its reversible elasticity. The ratios of the ingredients which are preferred for most uses lie in the range of from about 55% to about 65% of chlorinated wax to from about 45% to about 35% of polystyrene, although as little as 35% and as much as 70% of chlorinated wax produces a resinous mixture which may be valuable for specific purposes.

Those compositions of the present invention which contain more than about 60% of chlorinated wax are particularly suitable for use in the manufacture of tubing and also as coatings of surfaces which may be subjected to flexural stresses, while compositions containing less than about 60% of chlorinated wax and, in particular, from about 50% to about 60% thereof, are highly useful as cable coatings used in insulating low voltage electrical circuits.

The presence of chlorinated wax, which does not adversely affect the resistance of polystyrene to water and moisture and also decreases its inflammability, renders the aforementioned compositions particularly valuable for use under varying conditions of humidity.

A further advantage of the presence of chlorinated wax in such compositions is the low volatility thereof as compared with other known plasticizers which are generally more volatile. This last property permits preserving the valuable elastic properties of polystyrene-chlorinated wax compositions.

Whenever the compositions of the present invention are to be exposed to higher temperatures, suitable stabilizers against possible adverse effects of heat and of chlorine liberated thereby, such as a small amount of alpha-pinene, may be added.

In the large scale production of these compositions, the use of ethylene dichloride solvent is preferably eliminated and the mixing is effected directly by means of any suitable apparatus, for instance: a kneader, a rubber mill, or a Banbury mixer.

It should be understood that the details set forth in the foregoing description by no means restrict the invention, and that changes and modifications may be made therein without substantially deviating from the scope thereof as defined in the appended claims.

We claim:

1. A plastic composition comprising a normally solid, hard polystyrene resin and from 35 to 70% by weight of a normally liquid chlorinated paraffin wax based on the total weight of said polystyrene resin and chlorinated wax, said plastic composition being pliable, resilient, dry to touch, reversibly elastic upon extensive deformation in the same general manner as rubber, and being stable against separation of said resin and said chlorinated wax into two phases.

2. A plastic composition as defined in claim 1 wherein the proportion of normally liquid chlorinated paraffin wax is from 55% to 65% by weight based on the total weight of said polystyrene resin and chlorinated wax.

3. A plastic composition comprising a normally solid, hard polystyrene resin and from 35% to 70% by weight of a normally liquid chlorinated petroleum hydrocarbon wax based on the total weight of said polystyrene resin and chlorinated wax, said wax containing 42% by weight of chlorine, said plastic composition being pliable, resilient, dry to touch, reversibly elastic upon extensive deformation in the same general manner as rubber, and being stable against separation of said resin and said chlorinated wax into two phases.

4. A plastic composition as defined in claim 3 wherein the proportion of chlorinated wax is from 55% to 65% by weight based on the total weight of said polystyrene resin and chlorinated wax.

LUDWIG H. DIMPFL.
WILLIAM E. ELWELL.

REFERENCES CITED

The following references are of record in the file of this patent:

UNITED STATES PATENTS

| Number | Name | Date |
|---|---|---|
| 2,158,281 | Ford et al. | May 16, 1939 |

OTHER REFERENCES

Hercules Powder Co. Publication "Clorafin." (Copyrighted 1944, pages 2 and 4.)

Diamond Alkali Co. Publication "Chlorowax." (Copyrighted 1945 but received in the Scientific Library June 16, 1945, page 4.)